United States Patent
Gong et al.

(10) Patent No.: US 12,210,708 B2
(45) Date of Patent: Jan. 28, 2025

(54) TOUCH PANEL AND TOUCH DEVICE

(71) Applicant: WUHAN CHINA STAR OPTOELECTRONICS SEMICONDUCTOR DISPLAY TECHNOLOGY CO., LTD., Hubei (CN)

(72) Inventors: Houfu Gong, Hubei (CN); Zengjian Jin, Hubei (CN); Leilei Luo, Hubei (CN); Yanan Wang, Hubei (CN); Yalong Ma, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/528,525

(22) Filed: Dec. 4, 2023

(65) Prior Publication Data

US 2024/0111388 A1    Apr. 4, 2024

Related U.S. Application Data

(63) Continuation of application No. 17/597,238, filed as application No. PCT/CN2021/139653 on Dec. 20, 2021, now Pat. No. 11,868,572.

(30) Foreign Application Priority Data

Dec. 14, 2021    (CN) .......................... 202111526674.1

(51) Int. Cl.
  G06F 3/044    (2006.01)
  G06F 3/041    (2006.01)

(52) U.S. Cl.
  CPC .......... G06F 3/0445 (2019.05); G06F 3/0446 (2019.05); *G06F 3/0412* (2013.01); *G06F 2203/04111* (2013.01)

(58) Field of Classification Search
  CPC ....... G06F 3/044; G06F 3/0445; G06F 3/0446
  See application file for complete search history.

(56) References Cited

U.S. PATENT DOCUMENTS

| | | |
|---|---|---|
| 2010/0007628 A1 | 1/2010 | Eriguchi et al. |
| 2010/0026660 A1 | 2/2010 | Kitamura |

(Continued)

FOREIGN PATENT DOCUMENTS

| | | |
|---|---|---|
| CN | 102955630 A | 3/2013 |
| CN | 104346011 A | 2/2015 |

(Continued)

OTHER PUBLICATIONS

International Search Report issued in International application No. PCT/CN2021/139653, mailed on Sep. 14, 2022, with English translation.

(Continued)

Primary Examiner — Sardis F Azongha
(74) Attorney, Agent, or Firm — HSML P. C.

(57) ABSTRACT

The present application provides a touch panel and a touch device. The touch panel comprises first channels and third channels that extend in a first direction and are arranged side by side. By reducing a distance between the third channel and the adjacent first channel, a touch sensing amount of the third channel is increased, and touch operations have improved accuracy and linearity in an edge area.

16 Claims, 6 Drawing Sheets

(56) References Cited

U.S. PATENT DOCUMENTS

| | | |
|---|---|---|
| 2012/0075218 A1 | 3/2012 | Lin |
| 2013/0278513 A1 | 10/2013 | Jang |
| 2014/0071360 A1 | 3/2014 | Chang et al. |
| 2016/0349890 A1 | 12/2016 | Weng et al. |

FOREIGN PATENT DOCUMENTS

| | | |
|---|---|---|
| CN | 104516561 A | 4/2015 |
| CN | 105353921 A | 2/2016 |
| CN | 205210854 U | 5/2016 |
| CN | 208061166 U | 11/2018 |
| CN | 208819186 U | 5/2019 |
| CN | 113126824 A | 7/2021 |
| CN | 113220159 A | 8/2021 |

OTHER PUBLICATIONS

Written Opinion issued in International application No. PCT/CN2021/139653, mailed on Sep. 14, 2022, with English translation.
Office Action issued in corresponding Chinese Patent Application No. 202111526674.1 dated May 9, 2023, with English translation; 20 pages provided.
Chinese Office Action issued in corresponding Chinese Patent Application No. 202111526674.1 dated May 9, 2023, pp. 1-9.
International Search Report in International application No. PCT/CN2021/139653, mailed on Sep. 14, 2022.
Written Opinion of the International Search Authority in International application No. PCT/CN2021/139653, mailed on Sep. 14, 2022.

TOUCH PANEL AND TOUCH DEVICE

FIELD OF DISCLOSURE

The present application relates to a field of display technology and in particular, to a touch panel and a touch device.

DESCRIPTION OF RELATED ART

With the development of touch technology, on-cell touch solutions are launched. Taking commonly used direct on cell touch (DOT) technology as an example, a touch layer is directly fabricated in the encapsulation layer. Such a solution directly integrates the touch layer into the encapsulation layer, and does not need to add an extra add-on touch layer, thus providing better transmittance and bending resistance, and can effectively reducing a thickness of a screen and reducing production costs.

Touch panels based on DOT technology usually have identical touch units designed in the touch layer and are arrayed over an entire surface. This design has no reference channel for a single touch unit on an edge of the touch panel. Further, limited by narrow bezels, a touch electrode pattern of the touch unit is not allowed to expand outward. When an active pen is used to operate on an edge of the touch panel, writing accuracy and linearity of the active pen are poor.

SUMMARY

The present application provides a touch panel and a touch device to alleviate a technical problem of poor touch accuracy and linearity on edge areas of conventional touch panels.

Accordingly, the present application provides solutions as follows.

The present application provides a touch panel, comprising:
- a plurality of first channels parallel to each other and extending along a first direction;
- a plurality of second channels parallel to each other and extending along a second direction; and
- a plurality of third channels parallel to the first channels, wherein the third channels are arranged on at least an edge of the touch panel;
- wherein a distance between a central axis of the third channel and a central axis of the adjacent first channel is less than a distance between central axes of each two adjacent first channels, and a width of each third channel along a direction perpendicular to the first direction is equal to a width of each first channel along the direction perpendicular to the first direction.

In the touch panel according to the present application, each first channel comprises two first driving electrodes spaced apart from each other, each third channel comprises a second driving electrode, a width of each second driving electrode along the direction perpendicular to the first direction is greater than a width of each first driving electrode along the direction perpendicular to the first direction.

In the touch panel according to the present application, the width of each second driving electrode along the direction perpendicular to the first direction is equal to a sum of the widths of each two first driving electrodes along the direction perpendicular to the first direction.

In the touch panel according to the present application, a distance between the central axis of each third channel and the central axis of the adjacent first channel is greater than half a distance between the central axes of each two adjacent first channels.

In the touch panel according to the present application, the touch panel further comprises a plurality of fourth channels parallel to the second channels, the fourth channels are located on at least another edge of the touch panel; wherein a distance between a central axis of each fourth channel and a central axis of the adjacent second channel is less than a distance between central axes of each two adjacent second channels, and a width of each fourth channel along a direction perpendicular to the second direction is equal to a width of each second channel along the direction perpendicular to the second direction.

In the touch panel according to the present application, each second channel comprises two first sensing electrodes spaced apart from each other, each fourth channel comprises a second sensing electrode, and a width of each second sensing electrode along the direction perpendicular to the second direction is greater than a width of each first sensing electrode along the direction perpendicular to the second direction.

In the touch panel according to the present application, the width of each second sensing electrode along the direction perpendicular to the second direction is equal to a sum of widths of each two first sensing electrodes along the direction perpendicular to the second direction.

In the touch panel according to the present application, a distance between a central axis of each fourth channel and a central axis of the adjacent second channel is greater than half a distance between central axes of each two adjacent second channels.

In the touch panel according to the present application, the touch panel further comprises:
- a first metal layer patterned to form the first driving electrodes and the second driving electrodes;
- a second metal layer patterned to form the first sensing electrodes and the second sensing electrodes; and
- a first insulating layer disposed between the first metal layer and the second metal layer.

The touch panel of the present application further comprises:
- a third metal layer patterned to form the first driving electrodes, the second driving electrodes, the first sensing electrodes, and the second sensing electrodes;
- a second insulating layer disposed on the third metal layer and covering the third metal layer; and
- a bridging layer disposed on one side of the second insulating layer away from said third metal layer, the bridging layer comprising a plurality of bridging electrodes;
- wherein the first driving electrodes, the second driving electrodes, the first sensing electrodes, and the second sensing electrodes are formed by patterned electrode blocks electrically connected, wherein the electrode blocks of the first driving electrodes and the electrode blocks of the second driving electrodes are bridged by different bridging electrodes, or the electrode blocks of the first sensing electrodes and the electrode blocks of the second sensing electrodes are bridged by different bridging electrodes.

In the touch panel of the present application, a width of a first interval along a direction perpendicular to the first direction is equal to twice a width of a second interval along the direction perpendicular to the first direction.

In the touch panel of the present application, a width of a third interval along a direction perpendicular to the second direction is equal to twice a width of a fourth interval along the direction perpendicular to the second direction.

The present application further provides a touch panel which comprises a display panel and a touch panel of one of the foregoing embodiments, the touch panel is located in a light emitting direction of the display panel.

Advantages of the Present Application:

In a touch panel and a touch device of the present application, the touch panel comprises a plurality of first channels and a plurality of third channels that extend in a first direction and are arranged side by side. A distance between a central axis of the third channel and a central axis of the adjacent first channel is less than a distance between central axes of the two adjacent first channels. A width of the third channel along a direction perpendicular to the first direction is equal to a width of the first channel along the direction perpendicular to the first direction. By reducing the distance between the third channel and the adjacent first channel, a touch sensing amount of the third channel is increased, and touch operations have improved accuracy and linearity in an edge area.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

Figure 1:
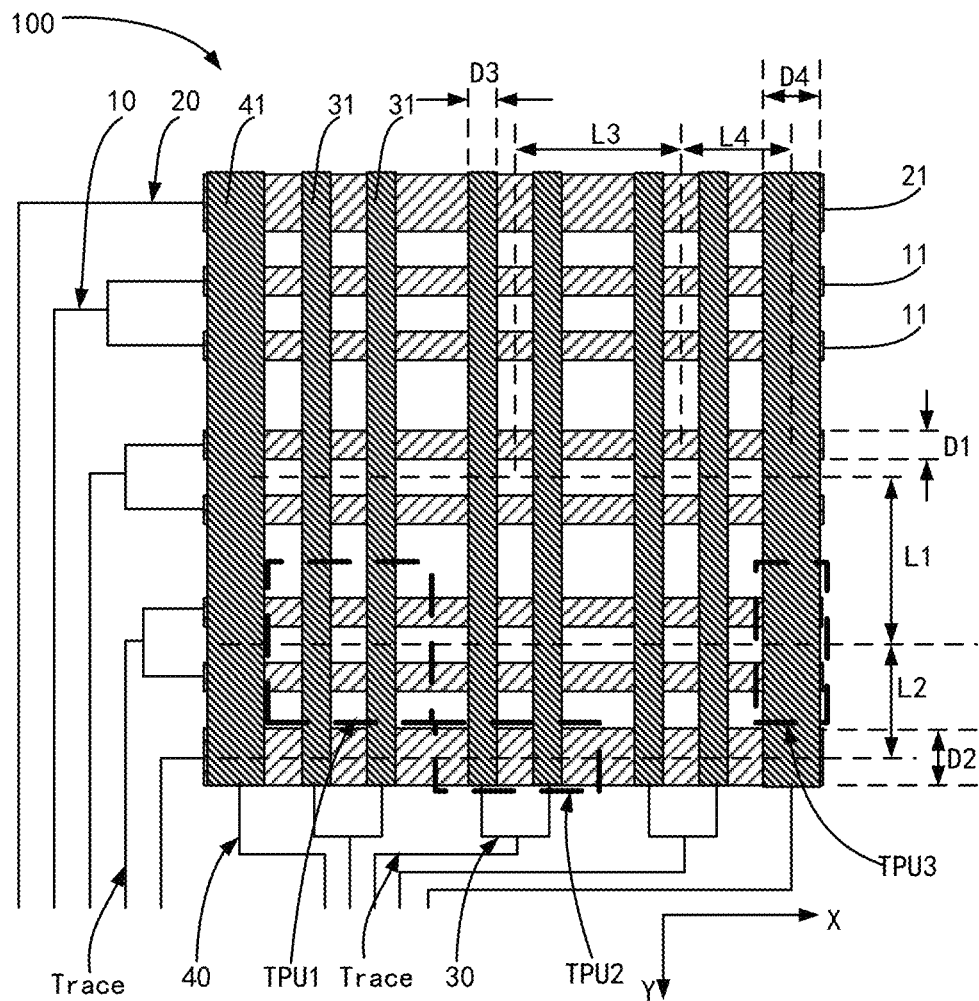
FIG. 1 is a schematic top view illustrating a touch panel according to one embodiment of the present application.

Specific embodiments of the present application are described with reference to the accompanying drawings. The directional terms mentioned in the present application, such as "up", "down", "front", "rear", "left", "right", "inner", "outer", "lateral", are only for illustrative purposes based on the directions in the accompanying drawings. Therefore, the directional terms are used to illustrate and understand the present application, rather than to limit the present application. In the drawings, structurally similar components are denoted by the same reference numerals. In the drawings, the thickness of some layers and some areas are exaggerated for clear understanding and simple descriptions. That is to say, the size and thickness of each component shown in the drawings are not to scale, and the present application is not limited in this regard.

Figure 2:
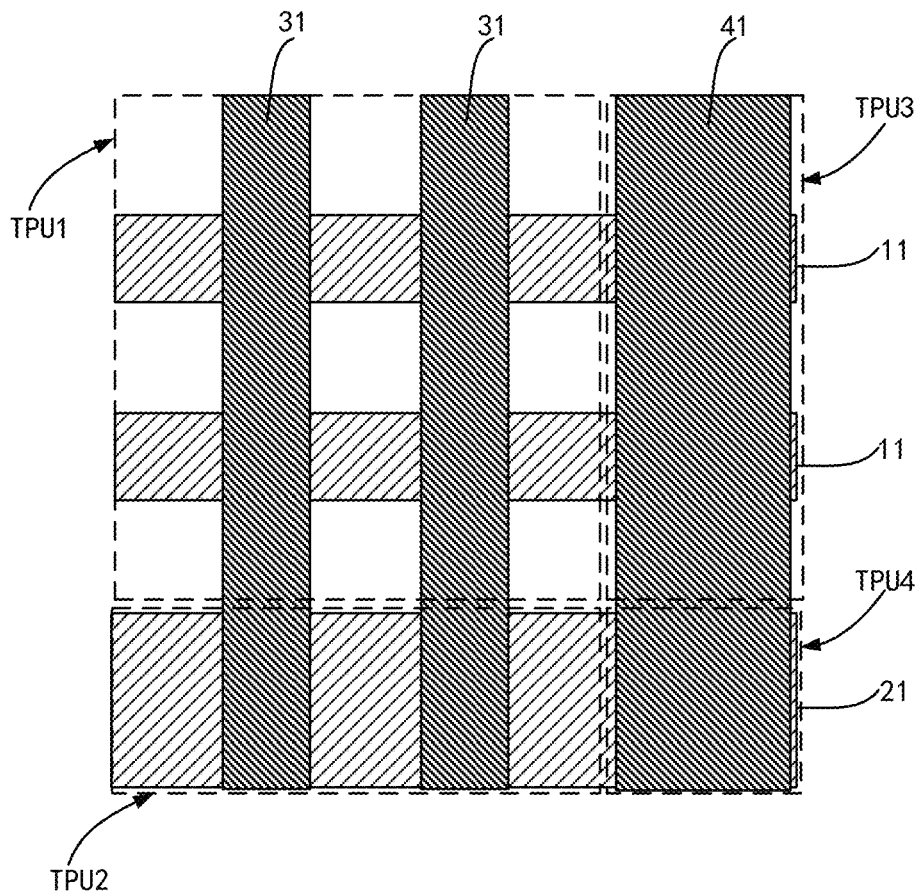
FIG. 2 is a schematic enlarged view illustrating a touch unit of the touch panel according to one embodiment of the present application.
Figure 3:
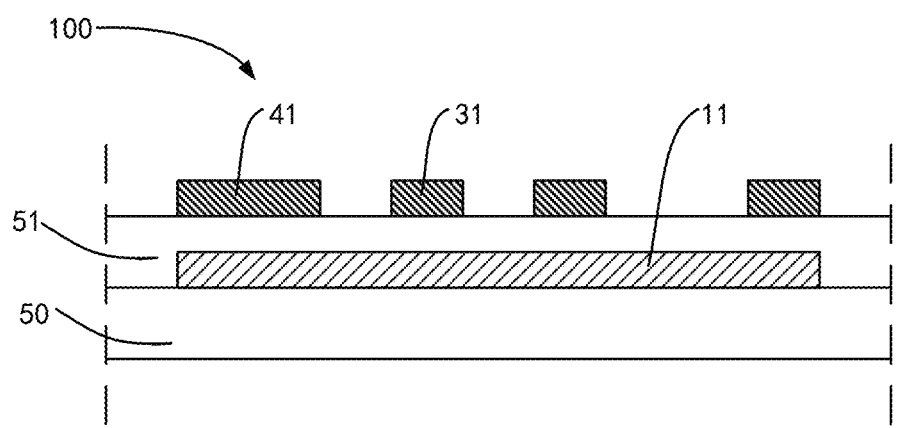
FIG. 3 is a schematic cross-sectional view illustrating the touch panel according to one embodiment of the present application.

Please refer to FIGS. 1 to 3. FIG. 1 is a schematic top view of a touch panel according to one embodiment of the present application. FIG. 2 is an enlarged view of a touch unit on the touch panel according to one embodiment of the present application. FIG. 3 is a cross-sectional structure of the touch panel according to one embodiment of the present application. The touch panel 100 comprises: a plurality of parallel first channels 10 extending along a first direction X; a plurality of third channels 20 arranged parallel to the first channels 10, wherein the plurality of third channels 20 are disposed on at least one edge of the touch panel 100; a plurality of parallel second channels 30 extending along a second direction Y; and a plurality of fourth channels 40 arranged parallel to the second channels 30, wherein the fourth channel 40 is disposed on at least another edge of the touch panel 100. The first channels 10 and the third channels 20 are used to provide driving signals to the touch panel 100, and the second channel 30 and the fourth channel 40 are used to return back touch sensing signals.

It should be noted that the first direction X is a horizontal direction, the second direction Y is a vertical direction, and an included angle between the first direction X and the second direction Y is 90 degrees; however, certainly the present application is not limited in this regard. That is to say, the first direction X of the present application can also be the vertical direction, the second direction Y can also be the horizontal direction, or the included angle between the first direction X and the second direction Y can also be other degrees.

Specifically, the first channels 10 are located in a middle area of the touch panel 100, and the number of the third channels 20 is two. The two third channels 20 are located in two edge areas of the touch panel 100, and the first channels 10 are located between the two third channels 20. Certainly, the present application is not limited in this regard, and the present application can have only one third channel 20 according to actual needs, and the one third channel 20 is located in an edge area of the touch panel 100.

A distance L2 between a central axis of the third channel 20 and a central axis of the adjacent first channel 10 is less than a distance L1 between central axes of the two adjacent first channels 10, so that the distance between the third channel 20 and the adjacent first channel 10 is reduced. Specifically, there is a first interval between pairs of the adjacent first channels 10, there is a second interval between the third channel 20 and the adjacent first channels 10, and a width of the first interval along a direction perpendicular to the first direction X is greater than a width of the second interval along the direction perpendicular to the first direction X. Optionally, the width of the first interval along the direction perpendicular to the first direction X is twice the width of the second interval along the direction perpendicular to the first direction X.

Furthermore, a width of the third channel 10 along the direction perpendicular to the first direction X is equal to a width of the first channel 10 along the direction perpendicular to the first direction X. In this case, it is necessary to ensure that the distance L2 between the central axis of the third channel 20 and the central axis of the adjacent first channel 10 is greater than half the distance L1 between the central axes of the two adjacent first channels 10. Specifically, each of the first channels 10 comprises two first driving electrodes 11 arranged spaced apart, and each of the third channels 20 comprises a second driving electrode 21. The first driving electrodes 11 and the second driving electrodes 21 are arranged in a same layer. Each of the first channels 10 is connected to a touch wire (Trace), and each of the third channels 20 is also connected to a touch wire (Trace). A width D2 of the second driving electrode 21 along the direction perpendicular to the first direction X is greater than a width D1 of the first driving electrode 11 along the direction perpendicular to the first direction X. Optionally, the width D2 of the second driving electrode 21 along the direction perpendicular to the first direction X is equal to a sum of the widths D1 of the two first driving electrodes 11 along the direction perpendicular to the first direction X.

It should be noted that the central axis of each channel in the present application refers to a symmetrical axis of each channel. The electrodes of each channel are symmetrical about the symmetrical axis. For example, the two first driving electrodes 11 in the first channel 10 are symmetrical about the central axis of the first channel 10.

Further, the second channels 30 are located in a middle area of the touch panel 100, and the number of the fourth channels 40 is two. The two fourth channels 40 are respectively located in two edge areas of the touch panel 100, so the second channels 30 are located between the two fourth channels 40. Certainly, the present application is not limited in this regard. The present application can also have only one fourth channel 40 according to actual needs, and the fourth channel 40 is located in one edge area of the touch panel 100. In addition, it should be noted that, although FIG. 1 shows three first channels 10 and three second channels 30, the present application is not limited in this regard. The touch panel 100 of the present application can also comprise more or less first channels 10 and more or less second channels 30.

A distance L4 between a central axis of the fourth channel 40 and a central axis of the adjacent second channel 30 is less than a distance L3 between the central axes of the two adjacent second channels 30, so that the distance between the fourth channel 40 and the adjacent second channel 30 is reduced. Specifically, there is a third interval between pairs of adjacent second channels 30, and there is a fourth interval between the fourth channel 40 and the adjacent second channels 30. A width of the third interval along a direction perpendicular to the second direction Y is greater than a width of the fourth interval L4 along the direction perpendicular to the second direction Y. Optionally, the width of the third interval along the direction perpendicular to the second direction Y is twice the width of the fourth interval along the direction perpendicular to the second direction Y.

Further, a width of the fourth channel 40 along the direction perpendicular to the second direction Y is equal to a width of the second channel 30 along the second direction Y. In this case, it is necessary to ensure that the distance L4 between the central axis of the fourth channel 40 and the central axis of the adjacent second channel 30 is greater than half the distance L3 between the central axes of the two adjacent second channels 30. Specifically, each of the second channels 30 comprises two first sensing electrodes 31 spaced apart from each other, and each of the fourth channels 40 comprises a second sensing electrode 41, the first sensing electrodes 31 and the second sensing electrodes 41 are arranged in a same layer, each of the second channels 30 is connected to a touch wire (Trace), and each of the fourth channels 40 is also connected to a touch wire (Trace). A width D4 of the second sensing electrode 41 along the direction perpendicular to the second direction Y is greater than a width D3 of the first sensing electrode 31 along the direction perpendicular to the second direction Y. Optionally, the width D4 of the second sensing electrode 41 along the direction perpendicular to the second direction Y is equal to a sum of the widths D3 of the two first sensing electrodes 31 along the direction perpendicular to the second direction Y.

The first channels 10 and the third channels 20 are crisscrossed with the corresponding second channels 30 and the corresponding fourth channels 40, so that the touch panel 100 is divided into a plurality of touch units. Specifically, the first channels 10 and the second channels 30 are crisscrossed to form a plurality of first touch units TPU1, and the third channels 20 and the second channels 30 are crisscrossed to form a plurality of first touch units TPU2, and the fourth channels 40 and the first channels 10 are crisscrossed to form a plurality of third touch units TPU3. Certainly, in a boundary area between two edge areas of the touch panel 100, the third channel 20 is crisscrossed with the fourth channel 40 to form the fourth touch unit TPU4. An area of the first touch unit TPU2 and an area of the third touch unit TPU3 are both smaller than an area of the first touch unit TPU1. Certainly, it is obvious that the area of the fourth touch unit TPU4 is the smallest, that is, smaller than the areas of the other three touch units.

More specifically, the first touch unit TPU1 comprises two first driving electrodes 11 and two first sensing electrodes 31. The first driving electrodes 11 and the first sensing electrodes 31 are arranged in different layers. The second touch unit TPU2 comprises one second driving electrode 21 and two first sensing electrodes 31. The second driving electrode 21 and the first sensing electrode 31 are arranged in different layers. The third touch unit TPU3 comprises one second sensing electrode 41 and two first driving electrodes 11. The second sensing electrode 41 and the first driving electrode 11 are arranged in different layers. The fourth touch unit TPU4 comprises one second driving electrode 21 and one second sensing electrode 41, and the second driving electrode 21 and the second sensing electrode 41 are arranged in different layers.

Optionally, the touch panel 100 further comprises a substrate 50 and a first metal layer, a second metal layer, and a first insulating layer 51 stacked on the substrate 50. The first metal layer is patterned to form the first driving electrodes 11 and the second driving electrodes 21. FIG. 3 only shows the first driving electrode 11. The second metal layer is patterned to form the first sensing electrode 31 and the second sensing electrode 41. The first insulating layer 51 is located between the first metal layer and the second metal layer.

It should be noted that the "same layer arrangement" in the present application means that in the manufacturing process, a film layer formed of a same material is patterned to obtain at least two different structures, and the at least two different structures are arranged in a same layer. For example, the first driving electrode 11 and the second driving electrode 21 of the present embodiment are obtained by patterning the same metal film layer, then the first driving electrode 11 and the second driving electrode 21 are arranged in the same layer.

In the present embodiment, the third channel 20 and the fourth channel 40 in the edge areas of the touch panel 100 are designed differently from the first channel 10 and the second channel 30 in an in-plane area. The area of the touch unit in the edge area of the touch panel 100 is smaller than the area of the touch unit in the in-plane area. Further, the width of the second driving electrode 21 of the touch unit or the width of the second sensing electrode 41 in the edge area of the touch panel 100 is increased. Therefore, the driving electrode and the sensing electrode in the touch unit in the edge area of the touch panel 100 have an overlapping area is equal to an overlapping area of the driving electrode and the sensing electrode in the touch unit in the in-plane area of the touch panel 100. For example, an overlapping area of the second driving electrode 21 and the first sensing electrode 31 in the second touch unit TPU2 is equal to an overlapping area of the first driving electrode 11 and the first sensing electrode 31 in the first touch unit TPU1.

Accordingly, by reducing the area of the touch unit in the edge area of the touch panel 100, the distance between the third channel 20 and the adjacent first channel 10 is reduced, the distance between the fourth channel 40 and the second channel 30 is reduced, and the width D2 of the second driving electrode 21 in the third channel 20 is close or equal to the sum of the widths D1 of the two first driving electrodes 11 in the first channel 10, the width D4 of the second sensing electrode 41 in the fourth channel 40 is close or equal to the sum of the widths D3 of the two first sensing electrodes 31 in the second channel 30. Certainly, it is better to make the width D2 of the second driving electrode 21 in the third channel 20 be greater than the sum of the widths D1 of the two first driving electrodes 11 in the first channel 10 while ensuring that the area of the touch unit in the edge area does not increase. This way, while ensuring a touch sensing amount (sensibility) of the touch unit in the edge area, since the distance between the touch unit in the edge area and the touch unit in the in-plane area becomes smaller, the touch sensing amount of the adjacent channels in the edge area increases. This way, the touch position coordinates are calculated more accurately, which greatly improves accuracy and linearity of touch operations.

Figure 4:
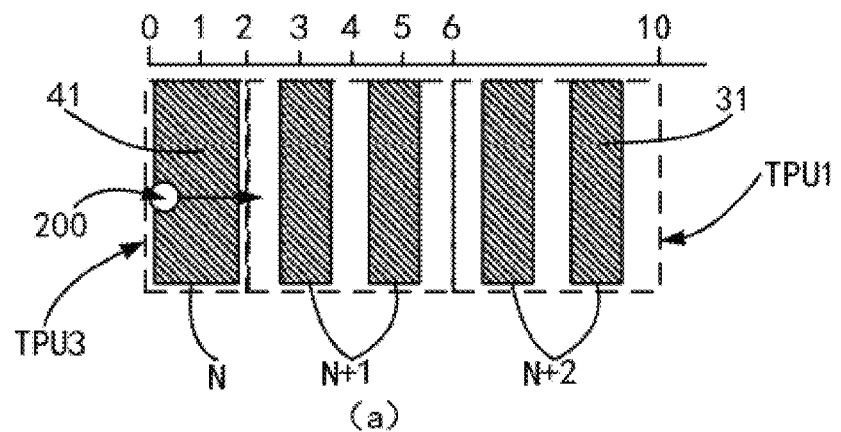
FIG. 4 is a schematic view illustrating curves of a touch sensing amount and linearity in an edge area of the touch panel according to one embodiment of the present application.
Figure 4:
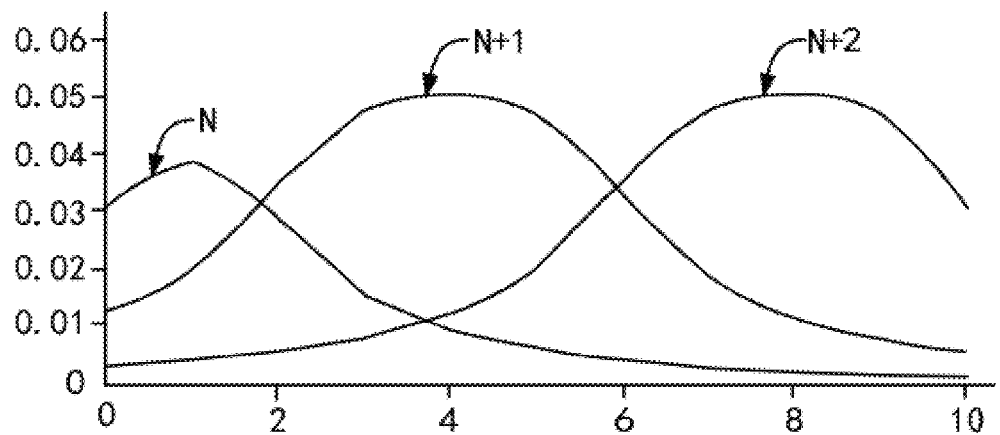
Figure 4:
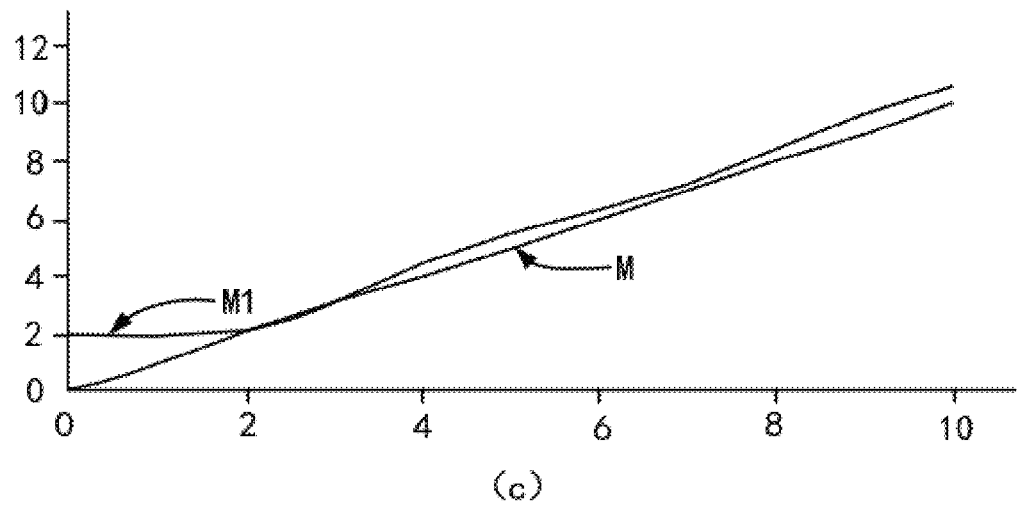
Figure 5:
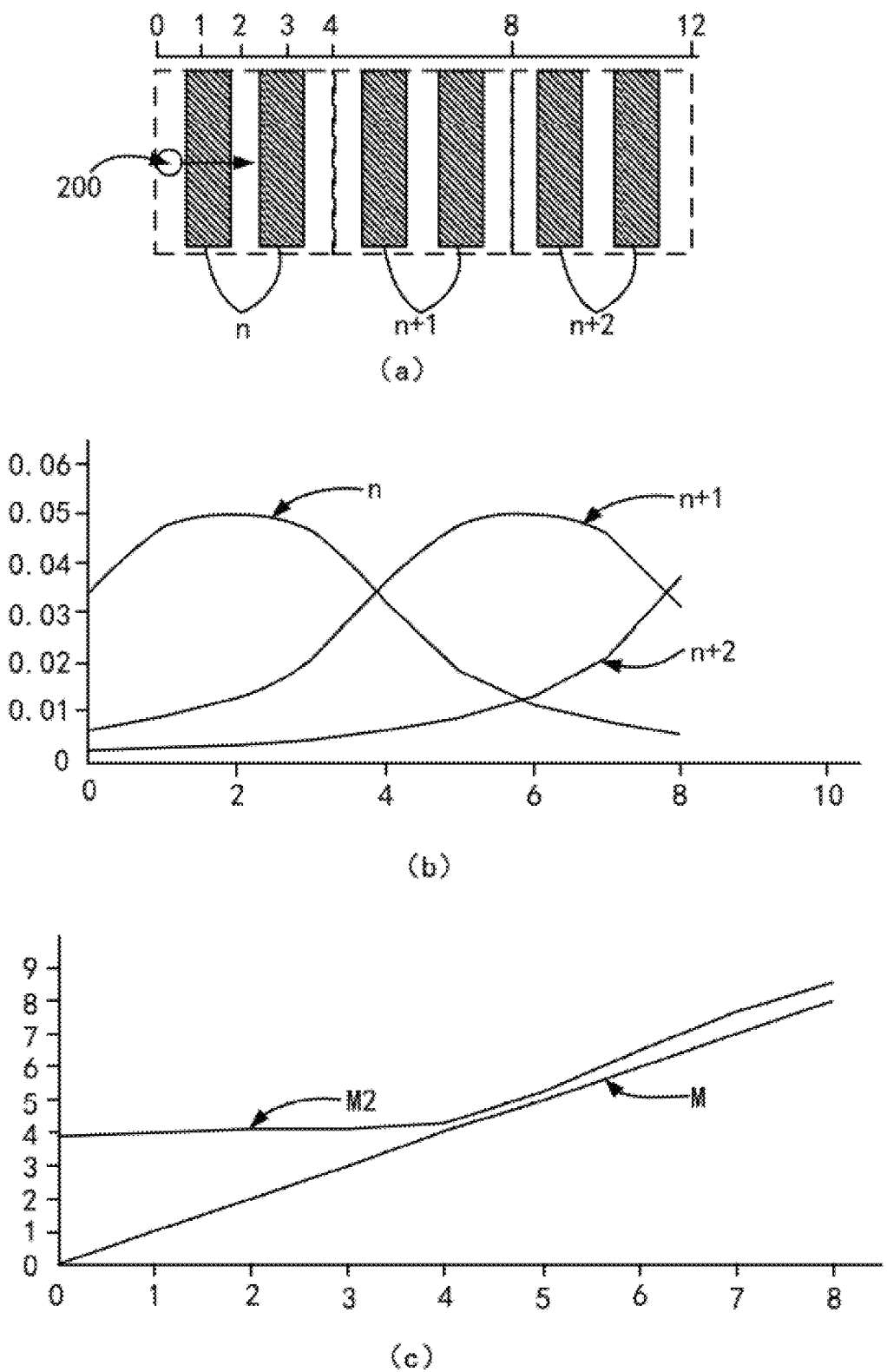
FIG. 5 is a schematic view illustrating curves of a touch sensing amount and linearity in an edge area of a conventional touch panel.

The following illustrates the changes in the touch sensing amount and linearity in the edge area of the touch panel 100 through simulation:

Specifically, please refer to FIGS. 1 to 5 in combination. FIG. 4 is a schematic view of curves about the touch sensing and linearity in the edge area of the touch panel according to one embodiment of the present application. FIG. 5 is a schematic view of curves about touch sensing and linearity in an edge area of a conventional touch panel. Taking the sensing channels of the touch panel 100 of the present application as an example, the fourth channel 40 in the edge area of the touch panel 100 is defined as a first passage N, and the two second channels 30 adjacent to the fourth channel 40 are respectively a second passage N+1 and a third passage N+2. The width D4 of the second sensing electrode 41 in the fourth channel 40 is equal to the sum of the widths D3 of the two first sensing electrodes 31 in the second channel 30, and the area of the third touch unit TPU3 is half the area of the first touch unit TPU1. As shown exemplarily in FIG. 4(a), a length of the third touch unit TPU3 is same as a length of the first touch unit TPU1, a width of the third touch unit TPU3 is 2, and a width of the first touch unit TPU1 is 4.

When a stylus 200 gradually slides from an edge of the first passage N to the second passage N+1 and the third passage N+2, touch sensing amounts of the first passage N, the second passage N+1, and the third passage N+2 show curves as a sliding distance of the stylus 200 changes, as shown in FIG. 4(b). An X-coordinate (horizontal) in FIG. 4(b) represents the distance that the stylus 200 slides in the width direction of the touch unit. Y-coordinate (vertical) in FIG. 4(b) represents the touch sensing amount. In addition, FIG. 4(c) is a schematic view showing a comparison between a touch linearity curve M1 and a theoretical linearity curve M of the touch panel 100 according to one embodiment of the present application.

In conventional techniques, a size of each touch unit of a conventional touch panel is the same, and a touch electrode configuration in each touch unit is also the same. As shown in FIG. 5(a), a channel in an edge area of the touch panel is similarly defined as a first passage n, and two channels adjacent to the first passage n are defined as a second passage n+1 and a third passage n+2. When the stylus 200 gradually slides from an edge of the first passage n to the second passage n+1 and the third passage n+2, touch sensing amounts of the first passage n, the second passage n+1, and the third passage n+2 show curves as a sliding distance of the stylus 200 changes, as shown in FIG. 5(b). The X coordinate (horizontal) in FIG. 5(b) represents the distance that the stylus 200 slides in a width direction of a touch unit, and the Y coordinate (vertical) in FIG. 5(b) represents the touch sensing amount. In addition, FIG. 5(c) shows a schematic view illustrating a comparison between a touch linearity curve M2 and a theoretical linearity curve M of the conventional touch panel.

By comparing the curves of the touch sensing amount of each channel shown in FIG. 4(b) and the touch sensing amount of each channel shown in FIG. 5(b), it can be known that in the touch panel 100 of the present application, when the stylus 200 slides in the first passage N in the edge area, because the distance between the first passage N and the second passage N+1 becomes smaller, the touch sensing amount of the second passage N+1 changes more obviously, the touch sensing amount is greatly improved, and a difference between the sensing amount of the first passage N and the sensing amount of the third passage N+2 is increased. This way, when a touch position of the stylus 200 is calculated, a calculated position is more accurate, and the accuracy of the touch operations in the edge area of the touch panel 100 is improved.

In addition, by comparing the linearity curve in FIG. 4(c) with the linearity curve in FIG. 5(c), it can be known that, in the touch panel 100 of the present application, when the stylus 200 slides in the first passage N in the edge area, since the area of the third touch unit TPU3 corresponding to the first passage N is reduced, the distance at which a deviation occurs is relatively greater, so that the linearity curve M1 becomes flatter and smoother than the theoretical linearity curve M. Accordingly, the touch linearity of the edge area of the touch panel 100 is improved.

Figure 6:
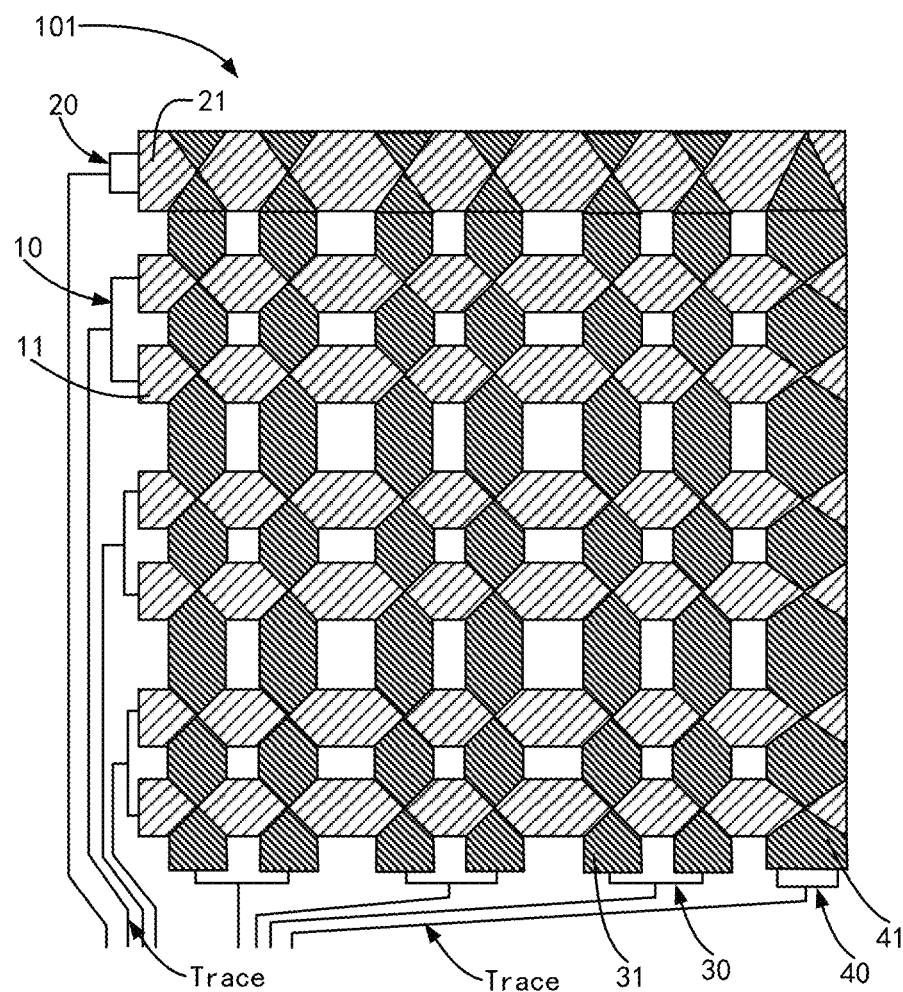
FIG. 6 is another top view of the touch panel according to one embodiment of the present application.
Figure 7:
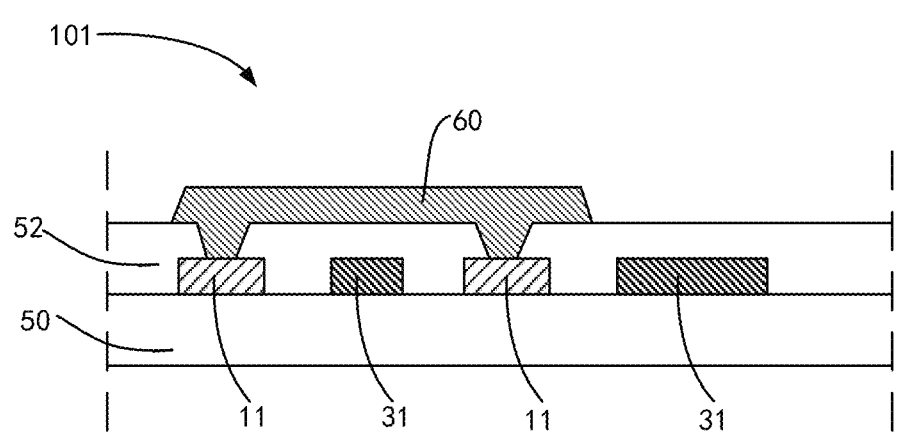
FIG. 7 is another cross-sectional view of the touch panel according to one embodiment of the present application.

Please refer to FIGS. 1 to 7. FIG. 6 is another top view of the touch panel according to one embodiment of the present application. FIG. 7 is another cross-sectional view of the touch panel according to one embodiment of the present application. The present embodiment is different from the foregoing embodiment in that the driving electrodes and the sensing electrodes are arranged in different layers. Specifically, the touch panel 101 further comprises a third metal layer, a second insulating layer 52, and a bridging layer. The third metal layer is patterned to form the first driving electrodes 11, the second driving electrodes 21, the first sensing electrodes 31, and the second sensing electrodes 41. The second insulating layer 52 covers the third metal layer. The bridging layer is disposed on one side of the second insulating layer 52 away from the third metal layer, and comprises a plurality of bridging electrodes 60.

The first driving electrodes 11, the second driving electrodes 21, the first sensing electrodes 31, and the second sensing electrodes 41 are all formed by patterned electrode blocks electrically connected to each other. The electrode blocks of the first driving electrode 11 and the electrode blocks of the second driving electrode 21 are bridged by different bridging electrodes 60, or the electrode blocks of the first sensing electrode 31 and the electrode blocks of the second sensing electrode 41 are bridged by different bridging electrodes 60. In the example of the present embodiment, the electrode blocks of the first driving electrode 11 and the electrode blocks of the second driving electrode 21 are bridged by different bridging electrodes 60.

It can be understood that the driving electrodes (comprising the first driving electrode 11 and the second driving electrode 21) and the sensing electrodes (comprising the first sensing electrode 31 and the second sensing electrode 41) are arranged in the same layer. Further, the driving electrode and the sensing electrode need to be electrically insulated from each other. Therefore, the bridging layer is provided at positions where the driving electrodes and the sensing electrodes overlap to avoid contact between the driving electrodes and the sensing electrodes. The electrode blocks of the driving electrodes and the electrode blocks of the sensing electrodes can have other regular or irregular patterns such as diamonds. Certainly, the second sensing electrode 41 and the second driving electrode 41 in the edge area of the touch panel 101 have different widths from the width of the first sensing electrode 31 and the width D1 of the first driving electrode 11 in the in-plane area. Consequently, the electrode blocks of the second sensing electrode 41 in the edge area are different from the electrode blocks of the first sensing electrode 31, and the electrode blocks of the second driving electrode 21 are different from the electrode blocks of the first driving electrode 11, as shown in FIG. 6. In addition, it should be noted that FIG. 6 only shows a design in a portion of the edge area of the touch panel 101, and other edge areas can refer to the design. For other descriptions, please refer to the above-mentioned embodiment, which will not be repeated here.

Figure 8:
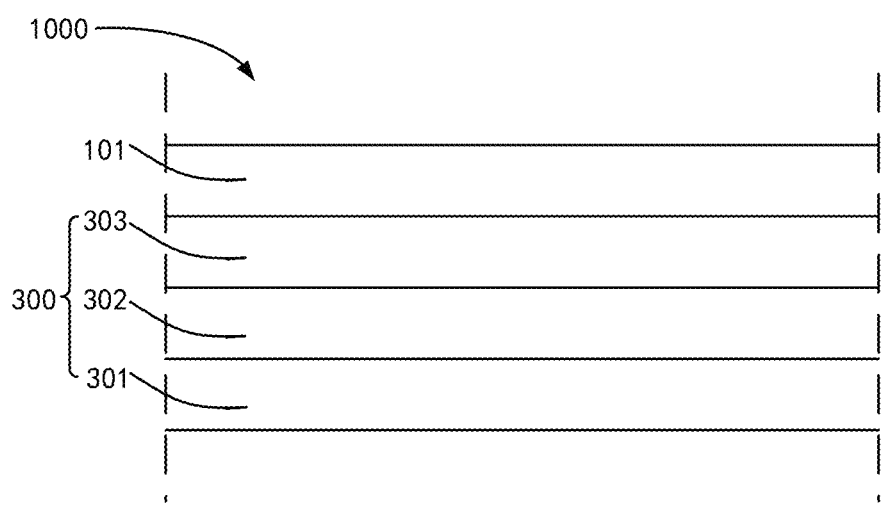
FIG. 8 is a cross-sectional view of a touch device according to one embodiment of the present application.

Based on the same inventive concept, the present application also provides a touch device. Please refer to FIGS. 1 to 8 in combination. FIG. 8 is a cross-sectional view of the touch device according to one embodiment of the present application. The touch device 1000 comprises a display panel 300 and the touch panel 100 of one of the above embodiments. The present embodiment is described taking the touch panel 100 as an example. The touch panel 100 is located in a light emitting direction of the display panel 300.

Specifically, the display panel 300 comprises an OLED display panel and the like. The OLED display panel comprises a driving circuit layer 301, a light-emitting functional layer 302 on the driving circuit layer 301, and an encapsulation layer 303 on the light-emitting functional layer 302. The touch panel 100 is directly produced in the encapsulation layer 303. Of course, the present application is not limited in this regard, and the touch panel 100 of the present application can also be an added-on type in the light emitting direction of the OLED display panel.

According to the above embodiment, it can be known that:

In a touch panel and a touch device of the present application, the touch panel comprises a plurality of first channels and a plurality of third channels that extend in a first direction and are arranged side by side. A distance between a central axis of the third channel and a central axis of the adjacent first channel is less than a distance between central axes of the two adjacent first channels. A width of the third channel along a direction perpendicular to the first direction is equal to a width of the first channel along the direction perpendicular to the first direction. By reducing the distance between the third channel and the adjacent first channel, a touch sensing amount (sensibility) of the third channel is increased, and touch operations have improved accuracy and linearity in an edge area.

In the above-mentioned embodiments, the description of each embodiment has its own emphasis. For those that are not described in detail in one embodiment, reference can be made to related descriptions of other embodiments.

The present application is described in detail above, and specific examples are used in the present disclosure to illustrate the working principles and embodiments of the present application. The descriptions of the above embodiments are only for ease of understanding the technical solutions and main ideas of the present application. Persons of ordinary skill can still modify the technical solutions described in the foregoing embodiments, or equivalently replace some of the technical features. Such modifications or replacements should be deemed to be within the protection scope of the technical solution of each embodiment.

What is claimed is:

1. A touch panel, comprising:
   a plurality of first channels parallel to each other and extending along a first direction;
   a plurality of second channels parallel to each other and extending along a second direction; and
   a plurality of third channels parallel to the first channels;
   wherein a distance between a central axis of a third channel of the plurality of third channels and a central axis of an adjacent first channel of the plurality of first channels is less than a distance between central axes of each two adjacent first channels, and a channel width of each third channel is equal to a channel width of each first channel;
   wherein at least one of the first channels comprises a plurality of first driving electrodes spaced apart from each other, at least one of the third channels comprises a second driving electrode, a channel width of each second driving electrode along a direction perpendicular to the first direction is greater than a channel width of each first driving electrode along the direction perpendicular to the first direction; and
   wherein a width of the third channel is greater than a width of the first driving electrode and less than or equal to a width of the first channel.

2. The touch panel according to claim 1, wherein the channel width of each second driving electrode is equal to a sum of the channel widths of each two first driving electrodes, and a distance between the central axis of each third channel and the central axis of the adjacent first channel is greater than half a distance between the central axes of each two adjacent first channels.

3. The touch panel according to claim 1, wherein the touch panel further comprises a plurality of fourth channels parallel to the second channels, the fourth channels are located on at least another edge of the touch panel; wherein a distance between a central axis of each fourth channel and a central axis of an adjacent second channel is less than a distance between central axes of each two adjacent second channels, and a channel width of each fourth channel is equal to a channel width of each second channel.

4. The touch panel according to claim 3, wherein the first channels and the third channels are crisscrossed with corresponding second channels, so that the touch panel is divided into a plurality of touch units, the first channels and the second channels are crisscrossed to form a plurality of first touch units, the third channels and the second channels are crisscrossed to form a plurality of first touch units, the fourth channels and the first channels are crisscrossed to form a plurality of third touch units, and the third channels and the fourth channels are crisscrossed to form a plurality of fourth touch units.

5. The touch panel according to claim 4, wherein an area of each second touch unit of the plurality of second touch units and an area of each third touch unit of the plurality of third touch units are both smaller than an area of each first touch unit of the plurality of first touch units, and an area of each fourth touch unit of the plurality of fourth touch units is smaller than the area of the second touch unit.

6. The touch panel according to claim 3, wherein at least one of the second channels comprises a plurality of first sensing electrodes spaced apart from each other, at least one of the fourth channels comprises a second sensing electrode, and a channel width of each second sensing electrode is greater than a channel width of each first sensing electrode.

7. The touch panel according to claim 6, wherein the channel width of each second sensing electrode along the direction perpendicular to the second direction is equal to a sum of channel widths of each two first sensing electrodes along the direction perpendicular to the second direction, and a distance between a central axis of each fourth channel and a central axis of the adjacent second channel is greater than half a distance between central axes of each two adjacent second channels.

8. The touch panel according to claim 6, further comprising:
a third metal layer patterned to form the first driving electrodes, the second driving electrodes, the first sensing electrodes, and the second sensing electrodes;
a second insulating layer disposed on the third metal layer and covering the third metal layer; and
a bridging layer disposed on one side of the second insulating layer away from said third metal layer, the bridging layer comprising a plurality of bridging electrodes;
wherein the first driving electrodes, the second driving electrodes, the first sensing electrodes, and the second sensing electrodes are formed by patterned electrode blocks electrically connected, wherein the electrode blocks of the first driving electrodes and the electrode blocks of the second driving electrodes are bridged by different bridging electrodes, or the electrode blocks of the first sensing electrodes and the electrode blocks of the second sensing electrodes are bridged by different bridging electrodes.

9. A touch device, comprising a display panel and a touch panel, wherein the touch panel is located in a light emitting direction of the display panel, and the touch panel comprises:
a plurality of first channels parallel to each other and extending along a first direction;
a plurality of second channels parallel to each other and extending along a second direction; and
a plurality of third channels parallel to the first channels;
wherein a distance between a central axis of a third channel of the plurality of third channels and a central axis of an adjacent first channel of the plurality of first channels is less than a distance between central axes of each two adjacent first channels, and a channel width of each third channel is equal to a channel width of each first channel;
wherein at least one of the first channels comprises a plurality of first driving electrodes spaced apart from each other, at least one of the third channels comprises a second driving electrode, a channel width of each second driving electrode is greater than a channel width of each first driving electrode; and
wherein a width of the third channel is greater than a width of the first driving electrode and less than or equal to a width of the first channel.

10. The touch device according to claim 9, wherein the channel width of each second driving electrode along a direction perpendicular to the first direction is equal to a sum of the channel widths of each two first driving electrodes along a direction perpendicular to the first direction, and a distance between the central axis of each third channel and the central axis of the adjacent first channel is greater than half a distance between the central axes of each two adjacent first channels.

11. The touch device according to claim 9, wherein the touch panel further comprises a plurality of fourth channels parallel to the second channels, the fourth channels are located on at least another edge of the touch panel; wherein a distance between a central axis of each fourth channel and a central axis of an adjacent second channel is less than a distance between central axes of each two adjacent second channels, and a channel width of each fourth channel is equal to a channel width of each second channel.

12. The touch device according to claim 11, wherein the first channels and the third channels are crisscrossed with corresponding second channels, so that the touch panel is divided into a plurality of touch units, the first channels and the second channels are crisscrossed to form a plurality of first touch units, the third channels and the second channels are crisscrossed to form a plurality of first touch units, the fourth channels and the first channels are crisscrossed to form a plurality of third touch units, and the third channels and the fourth channels are crisscrossed to form a plurality of fourth touch units.

13. The touch device according to claim 12, wherein an area of each second touch unit of the plurality of second touch units and an area of each third touch unit of the plurality of third touch units are both smaller than an area of each first touch unit of the plurality of first touch units, and an area of each fourth touch unit of the plurality of fourth touch units is smaller than the area of the second touch unit.

14. The touch device according to claim 11, wherein at least one of the second channels comprises a plurality of first sensing electrodes spaced apart from each other, at least one of the fourth channels comprises a second sensing electrode, and a channel width of each second sensing electrode is greater than a channel width of each first sensing electrode.

15. The touch device according to claim 14, wherein the channel width of each second sensing electrode is equal to a sum of channel widths of each two first sensing electrodes, and a distance between a central axis of each fourth channel and a central axis of the adjacent second channel is greater than half a distance between central axes of each two adjacent second channels.

16. The touch panel according to claim 14, further comprising:
a third metal layer patterned to form the first driving electrodes, the second driving electrodes, the first sensing electrodes, and the second sensing electrodes;
a second insulating layer disposed on the third metal layer and covering the third metal layer; and
a bridging layer disposed on one side of the second insulating layer away from said third metal layer, the bridging layer comprising a plurality of bridging electrodes;
wherein the first driving electrodes, the second driving electrodes, the first sensing electrodes, and the second sensing electrodes are formed by patterned electrode blocks electrically connected, wherein the electrode blocks of the first driving electrodes and the electrode blocks of the second driving electrodes are bridged by different bridging electrodes, or the electrode blocks of the first sensing electrodes and the electrode blocks of the second sensing electrodes are bridged by different bridging electrodes.

* * * * *